(12) United States Patent
Sanders et al.

(10) Patent No.: US 7,669,546 B2
(45) Date of Patent: Mar. 2, 2010

(54) METHOD AND APPARATUS OF COATING ARTICLES

(75) Inventors: Nigel Hugh Sanders, Toronto (CA); Anthony Gregory Smith, Bath (GB); David Michael Thomas, Bristol (GB)

(73) Assignee: Cadbury Schweppes Limited, London (GB)

( * ) Notice: Subject to any disclaimer, the term of this patent is extended or adjusted under 35 U.S.C. 154(b) by 1004 days.

(21) Appl. No.: 10/999,309

(22) Filed: Nov. 30, 2004

(65) Prior Publication Data
US 2005/0095329 A1 May 5, 2005

Related U.S. Application Data

(62) Division of application No. 10/784,618, filed on Feb. 23, 2004, now Pat. No. 7,055,456, which is a division of application No. 09/600,769, filed on Nov. 9, 2000, now Pat. No. 6,730,344.

(51) Int. Cl.
*B05C 5/00* (2006.01)
(52) U.S. Cl. ............ 118/24; 118/20; 118/DIG. 4; 118/62; 118/63
(58) Field of Classification Search .......... 118/24, 118/20, DIG. 4, 62, 63; 427/348, 420; 99/450.1; 222/146.2, 146.4, 630, 637, 190, 195, 460; 141/67, 70, 105, 297, 300; 406/136–138, 406/146; 62/1, 340
See application file for complete search history.

(56) References Cited

U.S. PATENT DOCUMENTS

| | | | |
|---|---|---|---|
| 1,737,447 A | 11/1929 | Baker et al. | 426/306 |
| 1,984,009 A | 12/1934 | Baker et al. | 426/306 |
| 3,305,142 A * | 2/1967 | Caldwell | 222/195 |
| 3,470,831 A | 10/1969 | von Drachenfels | 426/306 |
| 3,549,336 A * | 12/1970 | Hodel | 23/313 R |
| 3,797,707 A * | 3/1974 | Jenike et al. | 406/137 |
| 3,806,289 A | 4/1974 | Schwarz | 425/72.2 |
| 4,128,667 A | 12/1978 | Timson | 427/348 |
| 4,871,105 A | 10/1989 | Fisher et al. | 228/33 |
| 5,004,620 A | 4/1991 | Straight et al. | 426/304 |
| 5,409,733 A | 4/1995 | Boger et al. | 427/96.4 |
| 5,480,664 A | 1/1996 | Ferrero | 426/307 |
| 5,902,648 A | 5/1999 | Naka et al. | 427/558 |
| 6,426,119 B1 * | 7/2002 | Yapel et al. | 427/335 |

FOREIGN PATENT DOCUMENTS

| | | |
|---|---|---|
| EP | 0 444 767 | 9/1991 |
| EP | 0 551 237 | 7/1993 |
| GB | 1 559 701 | 1/1980 |
| GB | 2326116 | 12/1998 |

* cited by examiner

*Primary Examiner*—Laura Edwards
(74) *Attorney, Agent, or Firm*—Ohlandt, Greeley, Ruggiero & Perle, L.L.P.

(57) ABSTRACT

A coating such as liquid milk chocolate is applied to articles such as confectionery bars. The bars are conveyed by conveyor under a curtain of liquid chocolate issuing through an outlet slot in a trough. A layer of air is caused to flow through the outlet slot in the trough so as to modify the flow characteristics of the curtain. The layer of air permits a curtain of even thickness to be achieved.

20 Claims, 1 Drawing Sheet

METHOD AND APPARATUS OF COATING ARTICLES

CROSS REFERENCE TO RELATED APPLICATIONS

This application is a divisional of U.S. application Ser. No. 10/784,618 filed Feb. 23, 2004 U.S. Pat. No. 7,055,456 issued on Jun. 6, 2006, which is a divisional of application Ser. No. 09/600,769 files Nov. 9, 2000 U.S. Pat. No. 6,730,344 issued on May 4, 2004.

BACKGROUND OF THE INVENTION

1. Field of the Invention

This invention relates, in a first of its aspects, to a method of and an apparatus for applying a coating to articles, eg an edible coating to food articles. The invention is particularly, but not exclusively, concerned with the application of edible coating materials which exhibit non-Newtonian behavior, for example chocolate, to articles of confectionery and the like. The present invention also relates, in a second of its aspects, to an improved method of forming a curtain of material eg edible material which can be used to coat articles eg articles of food or which can be used in other ways in the formation of articles, eg articles of food.

2. Description of Related Art

It is well known to enrobe articles of food such as chocolate assortments, confectionery bars, biscuits, cookies and cakes with a layer of chocolate. This coating process is known as chocolate enrobing and is traditionally effected by moving the articles on a mesh-type conveyor belt through a curtain of liquid chocolate whose consistency is carefully controlled. However, it is difficult to achieve the desired coating because of the high viscosity. It is therefore common practice to subject the articles to a greater than needed coating, then controlling the amount of chocolate remaining on the articles by blowing by air from fans and using vibration to remove the excess.

Also, the temperature of chocolate cannot be increased so as to reduce its viscosity as it will lose its temper, causing problems of incorrect fat crystallisation which can deleteriously affect the appearance and/or eating quality of the chocolate. Thus, it is common for enrobing chocolate to have a higher fat content than standard chocolate used for making chocolate bars in order to reduce its viscosity. This has adverse cost implications.

In order to establish the curtain of chocolate, it is known to allow chocolate to pass under the action of gravity through an outlet slot in the bottom of a trough having inclined side walls leading to the slot. This type of apparatus has a relatively low throughput because of the high viscosity of the chocolate and the relatively low rate at which it can flow through the outlet slot. The common solution to this problem is to use a wider slot, which results in a thicker curtain which then requires removal of more excess from the articles. Because of the physical characteristics of the chocolate which passes through the slot, the curtain can "neck" to a substantial extent. In other words, the width of the chocolate curtain becomes substantially less than the length of the slot from which it issues. This means that the effective cover of the curtain over the width of the conveyor belt used to carry the articles through the curtain is reduced.

Another known form of apparatus for producing a chocolate curtain utilises a roller along which liquid chocolate is distributed and carried to a blade which causes the layer of chocolate on the roller to become detached and thereby establish the curtain. This can provide higher coating rates with a better control of curtain thickness, but difficulties still arise in coating.

With both of the above types of known apparatus, the amount of chocolate in the descending curtain is greatly in excess of that required to coat the articles. The excess drains through the mesh-type conveyor belt and needs to be recycled and its condition carefully controlled.

SUMMARY OF THE INVENTION

It is an object of a first aspect of the present invention to obviate or mitigate at least some of the above disadvantages.

In accordance with said first aspect of the present invention, there is provided a method of applying a coating to articles, comprising the steps of:

(i) providing a curtain of solidifiable liquid coating material;
(ii) effecting relevant movement between articles to be coated and the curtain so as to coat the articles with the solidifiable liquid coating material; and
(iii) subjecting the solidifiable liquid coating material to the action of at least one stream of gas under pressure whereby to modify the flow characteristics of the curtain.

Also in accordance with said first aspect of the present invention, there is provided apparatus for applying a coating to articles, comprising:

(i) supply means arranged to provide a curtain of solidifiable liquid coating material;
(ii) means for effecting relative movement between articles to be coated and the supply means whereby in use the articles are coated with the solidifiable liquid coating material in the curtain; and
(iii) means arranged to subject the solidifiable liquid coating material to the action of at least one stream of gas under pressure whereby to modify the flow characteristics of the curtain.

Preferably, the articles are articles of food and the coating material is an edible coating material.

In the case where the present invention is used in a coating apparatus of the type in which the coating material is caused to flow along a surface of the supply means (eg a trough) towards an outlet slot through which the coating material flows under the action of gravity to form the curtain, it is preferred for said at least one stream of gas to be introduced between the coating material and the surface of the supply means. In this way, a layer of gas can be introduced between the surface and the coating material as it flows towards the outlet slot. Preferably, in the case of a trough where the coating material flows over opposed surfaces towards the outlet slot, a layer of gas is introduced between the coating material and each of the opposed surfaces. This can not only substantially reduce the resistance to flow of the coating material over the surfaces, but can also reduce the viscosity of the coating material if it is of a type whose viscosity is reduced when subjected to shear.

It is particularly preferred to cause said at least one stream of gas under pressure to become attached to the surface of the supply means so as to assist in establishing the layer of the gas between the surface and the coating material. This may be achieved by positioning one or more gas-admission slots in such a way as to direct the gas against the surface of the supply means. The spacing between the outlet slot and the or each gas-admission slot depends upon the nature of the coating material and the geometry of the supply means, which may comprise a trough having V-shaped walls defining opposed surfaces which converge towards the outlet slot. If the or each gas-admission slot is disposed too close to the outlet slot, then the flow of gas through the outlet slot may actually restrict the flow of coating material therethrough. On the other hand, if the or each gas-admission slot is disposed too far away from the outlet slot, the coating material flowing over the surface may become re-attached to the surface of the supply means before it reaches the outlet slot.

In the case where the above-mentioned trough is employed, it is within the scope of the present invention to provide said at least one stream of gas under pressure at one or both convergent opposed surfaces of the trough leading to the outlet slot.

Said at least one stream of gas under pressure may be applied to the coating material after the curtain has been established in order to change the direction of the curtain and/or a physical property of the coating material forming the curtain. It is also within the scope of the present invention to subject the coating material to the action of at least one stream of gas: both before and after the curtain has been established.

A curved surface may be provided adjacent to part of the curtain, and means may be provided for causing a stream of gas to flow over the curved surface by virtue of the Coanda effect and to use this to induce a change in the direction of travel of the curtain. In this way, it is possible to control the direction of flow of the curtain from any, angle from vertical to substantially horizontal. This effect can be used whether or not the coating material is subjected to the action of at least one stream of gas under pressure before the curtain is established. In this-regard, the curtain may be established by flow of the coating material through an outlet slot or by distributing the coating material over the length of a roller and causing it to be transported to a blade which removes the coating material from the roller and thereby establishes the curtain.

It is within the scope of the present invention to use one or more curtains of coating material to coat the articles and to control the direction of movement of these curtains simultaneously or independently in such a way as to ensure maximum coverage. For example, one of the curtains may be controlled so that its direction of movement is an acute angle (e.g. 45°) relative to the direction of relative movement between the articles and the curtain, whilst the other curtain can be controlled so that its direction of movement is at an obtuse angle (e.g. 135°) with respect to said direction of relative movement. In this way, coating of upstream and downstream ends of the articles may be facilitated.

In certain embodiments, the control of the pressure of the stream of gas can be employed to control the speed-of-descent of the curtain. Thus, by controlling the rate of descent of the curtain and the rate of relative movement between the articles and the curtain, a variety of different effects can be achieved. For example, if the rate of descent of the curtain is matched with the rate of relative movement, then a smooth coating can be achieved. If the rate of curtain descent is greater than the rate of relative movement, then a surface patterning effect can be: achieved by the resultant folding of the applied curtain onto the articles. On the other hand, if the rate of descent is less than the rate of relative movement, a degree of stretching of the coating material as it becomes attached to the articles may be achievable with resultant thinning of the layer of coating material applied to the articles. The effects achieved will also depend upon the physical properties of the coating material.

The present invention is applicable to the use of non-Newtonian liquids such as chocolate or Newtonian liquids such as caramel as coating materials.

In the case of chocolate (or other non-Newtonian liquid, a liquid whose viscosity reduces when subjected to shear), a very high degree of control is achievable because the stream of gas under pressure can be caused to contact the surface of the chocolate in such a way as to reduce its viscosity by application of a shear force. This has the particular advantage that the chocolate flows much more easily but then rapidly thickens once the shear force has been removed. The application of the stream of gas under pressure to the chocolate before the curtain has been established can enable the previously mentioned necking problem to be mitigated and can also enable a much higher throughput to be achieved for a given size of coating apparatus. Because of the viscosity reduction achieved, it is possible to coat with a much higher viscosity chocolate than has heretofore been considered possible. For example, it is possible to coat with relatively viscous tempered chocolate, rather than having to coat with a chocolate composition having an increased fat content and subsequently lowered tempered viscosity in order to establish and maintain the desired liquid curtain. The need to effect air blowing and/or vibration on the coated articles maybe obviated or mitigated. The present invention permits a curtain of even thickness to be achieved and may also enable a thinner curtain to be produced than has heretofore been possible.

Conveniently, the gas is air. The temperature of the gas may be substantially the same as that of the solidifiable liquid coating material. This is particularly advantageous in the case where the material is liquid chocolate.

It will be appreciated that the present invention in its first aspect involves the control of a curtain of solidifiable liquid coating material for the purpose of coating or enrobing articles. However, it will be appreciated that similar techniques can be employed for controlling a curtain of a solidifiable liquid material for use in the production of other articles. For instance, the curtain can be controlled for the purpose of enabling a layer of the material to be deposited into a mould or moulds (e.g. to produce shells of solidified material which can then be used to contain filling material), or onto a conveyor for solidification as a layer thereon which can be subsequently cut to size or otherwise shaped. The fact that the curtain can be very accurately controlled in terms of the thickness of the curtain and/or its angle speed of descent means that a close control over the thickness and/or texture of the deposit can be obtained which can be difficult to achieve with standard confectionery shell technology.

Thus, in its second aspect, the present invention resides in a method of controlling a curtain of a solidifiable liquid composition comprising the steps of:

(i) providing a curtain of solidifiable liquid material; and (ii) before, during and/or after step (i), subjecting the solidifiable liquid material to the action of at least one stream of gas under pressure whereby to modify the characteristics of the curtain.

Also in accordance with said second aspect of the present invention, there is provided apparatus for controlling curtain of a solidifiable liquid composition comprising:

(i) supply means-arranged to provide a curtain of solidifiable liquid coating material; and (ii) means arranged to subject the solidifiable liquid coating material to the action of at least one stream of gas under pressure whereby to modify the characteristics of the curtain.

The method and apparatus may further include provision for (a) depositing the modified curtain of solidifiable liquid composition to form a layer in a mould or on a surface, and (b) solidifying the deposited composition.

The solidifiable liquid composition is preferably an edible composition.

BRIEF DESCRIPTION OF THE DRAWINGS

Embodiments of the present invention will now be described, by way of example, with reference to the accompanying drawings, in which.

DETAILED DESCRIPTION OF THE INVENTION

Figure 1:
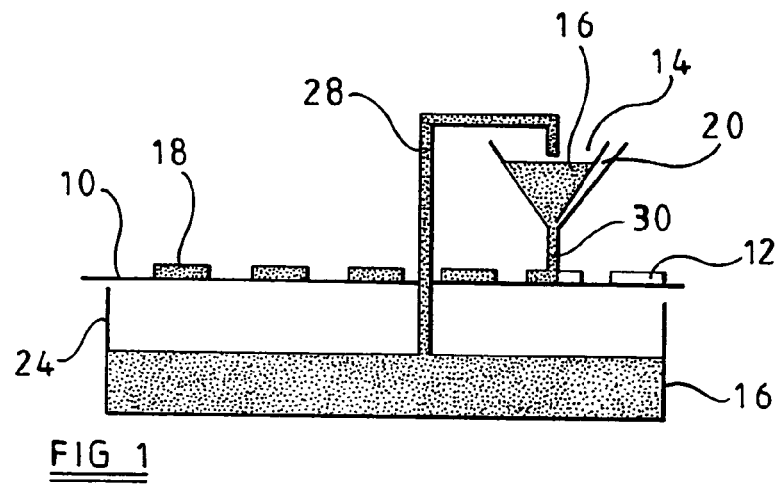
FIG. 1 is a schematic view of one embodiment of an apparatus according to the present invention, where, for ease of demonstration, only one longitudinal trough surface is shown with an air supply.
Figure 2:
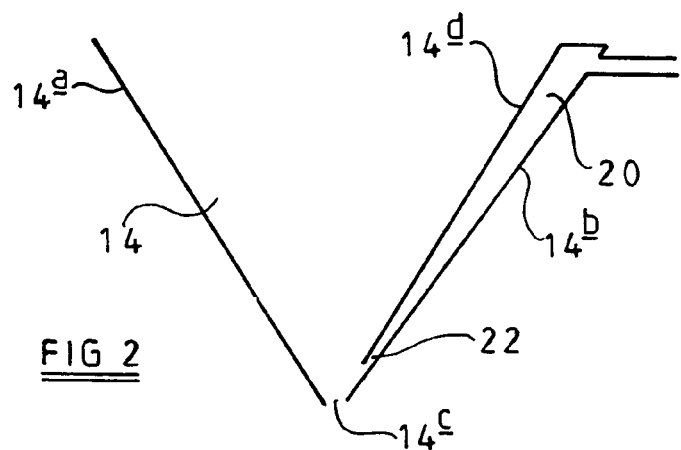
FIG. 2 is a side view of a trough forming part of the apparatus of FIG. 1.

Referring now to FIGS. 1 and 2 of the drawings, the apparatus illustrated therein is for enrobing confectionery bars with a layer of chocolate. The apparatus comprises a mesh-type conveyer belt 10 carrying confectionery bars 12 to be coated horizontally from right to left as viewed in FIG. 1. A liquid chocolate supply trough 14 is spaced above the conveyor 10 and comprises V-shaped walls 14a and 14b leading to a downwardly opening outlet slot 14c. The trough 14 contains liquid chocolate 16 which is to be used for coating the confectionery bars 12 to form coated confectionery bars 18.

The trough 14 contains an additional wall 14d which is inclined at an acute angle relative to the wall 14b and which terminates about 10 mm above the outlet slot 14c which, in this embodiment, has a width of about 2 mm. The walls 14b and 14d together define a downwardly convergent plenum chamber 20 terminating in an air-admission slot 22. The slot 22 has a width of 0.2 mm and extends for the whole length of the outlet slot 14c, and is disposed about 10 mm above the outlet slot 14c of the trough 14. The plenum chamber 20 is connected with a source of pressurized air. Although not shown in the drawings, the wall 14a is likewise provided with an additional wall defining an identical air-admission slot like slot 22.

Disposed below the conveyor 10 is a tank 24 which also contains liquid chocolate 16. A pump (not shown) serves to pump the liquid chocolate 16 from the tank 24 to the trough 14 via pipework 28.

In use, the conveyor belt 10 is operated to move the confectionery bars 12 in a path which carries them under the outlet slot 14c of the trough 14. The chocolate 16 in the trough 14 is typically maintained at a temperature in the range of 28 to 31° C. and travels through the slot 14c under the action of gravity so as to produce a curtain 30 of liquid chocolate through which the confectionery bars 12 pass. The curtain 30 extends perpendicularly across the conveyor belt 10 which carries a plurality of rows of the confectionery bars 12, although only one row of bars 12 is illustrated in the drawings. The resultant coated bars 18 are by the conveyor 10 and excess chocolate drips through the holes in the screen conveyor 10 and back into the tank 24 for recirculation.

During this time, air under pressure is supplied to the plenum chamber 20 so that it is ejected through the air-admission slot 22 so as to become attached to that portion of the wall 14b which lies between the slots 22 and 14c. The result of this is that a layer of air is inserted between the chocolate 16 passing towards the outlet slot 14c and the wall 14b immediately upstream of the slot 14c. The same occurs at the wall 14a. This substantially reduces the friction between the chocolate and the walls. Additionally, the pressurised air exerts a shear force on the adjacent surface of the chocolate, thus reducing the viscosity of the chocolate in the region of the outlet slot 14c. This improves the flowability of the chocolate so that it substantially increases the flow rate through the slot and also mitigates the necking problem whereby the width of the curtain 30, i.e. the dimension perpendicular to the plane of the drawing, can be maintained substantially the same as the length of the slot 14c.

In one experiment, it was found that no less than a 70% increase in the flow rate through the slot 14c could be achieved using an air supply pressure of 2 psig, as compared to the situation where no air is supplied through the gas-admission slot 22. Although, substantially improved, results could be achieved with air pressures as low as 0.5 psig and up to about 3 psig. It will be understood that the shear effect is produced because the air is moving at a greater rate than the chocolate with which it is in contact.

The above-described method enables improved control to be achieved, which can lead to the following advantages:
(a) lighter chocolate coatings,
(b) more precise coating with less excess deposit,
(c) less variation in deposit across the conveyor belt,
(d) faster enrobing speeds,
(e) lower proportion of chocolate to be recycled,
(f) less buildup of chocolate on the edges of the bars, leading to better edge definition,
(g) selective production of textured or plain coatings by adjustment of air pressure and conveyor belt speed.
(h) avoidance of the need to use enrobing chocolate (which has a high fat content to decrease its viscosity when liquid), thereby enabling the use of regular or even lower fat chocolate.

Figure 3:
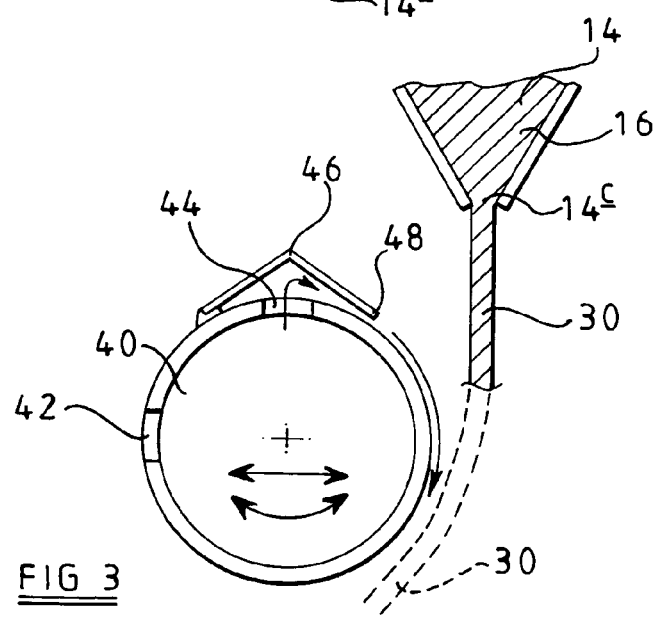
FIG. 3 is a schematic view of a second embodiment of apparatus according to the present invention.

Referring now to FIG. 3 of the drawings, there is illustrated an apparatus also in accordance with the present invention for altering the direction of descent of chocolate curtain 30. The chocolate curtain 30 may be one which has been produced as described hereinabove with reference to FIGS. 1 and 2. Alternatively, it may be a conventionally produced chocolate curtain which has been formed without introduction of an airstream into trough 14. As a further alternative, it may be a conventionally produced curtain formed by distributing a layer of liquid chocolate onto the surface of a roller and then detaching the layer from the roller by means of a blade.

In the apparatus of FIG. 3, there is provided a cylindrical plenum chamber 40 which is horizontally disposed to one side of the curtain 30 above the conveyer 10 and which extends for greater than the full width of the curtain 30. The plenum chamber 40 may conveniently be mounted on the trough 14 so that it can be positioned close to the outlet 14c. The plenum chamber 40 has a pressurised air inlet 42 and a row of upwardly directed air outlets 44 extending over the length of the plenum chamber 40. An angled cap 46 is secured to the outer periphery of the plenum chamber 40 along a longitudinal side edge thereof which is remote from the curtain 30. The opposite longitudinal side edge of the strip 46 is spaced from the peripheral surface of the plenum chamber 40 so as to define an air-exit slot 48. The slot 48 has a width of typically about 0.2 mm. The plenum chamber 40 can be moved laterally horizontally relative to the curtain 30 so as to enable the gap between it and the curtain 30 to be adjusted. Likewise, the plenum chamber 40 can be turned about its longitudinal axis to enable the position of the slot 48 relative to the curtain 30 to be adjusted.

In use, air is supplied through the inlet 42 into the plenum chamber 40 from whence it issues through the outlets 44 and thence through the outlet slot 48. It is thus caused to adhere to the curved peripheral surface of the plenum chamber 40 by virtue of the Coanda effect whereby it follows the external periphery of the plenum chamber 40 for a considerable distance. The effect of this curved flow of air is to draw the curtain 30 towards the plenum chamber 40, thus altering the angle of descent of the curtain 30. The angle of descent can be varied by varying the pressure of the air and/or by varying the positioning of the slot 48 relative to the curtain 30.

In FIG. 3, the plenum chamber 40 is shown on the downstream side of the curtain 30 relative to the conveying direction of the confectionery bars 12 through the curtain 30. Thus, the effect is to incline the direction of descent of the curtain 30 at an acute angle relative to the direction of movement of the confectionery bars 12. This can enable improved effects to be achieved. It is possible to "lay" the curtain 30 of chocolate gently onto the surfaces of the bars 12 by appropriately matching the rate of descent of the curtain 30 to the speed and movement of the bars 12. It is also considered that, because of the angling of the curtain 30, it will be possible to improve coating of the leading ends of the confectionery bars 12.

However, it will be appreciated that it is possible to locate the plenum chamber 40 on the opposite side of the curtain 30, ie on the upstream side thereof so as to cause the direction of descent of the curtain 30 to extend at an obtuse angle relative to the conveying direction of the confectionery bars 12. In this way, it is considered that an improved coating of the trailing ends of the confectionery bars 12 may be achievable. Also, further control over the effects produced can be achieved by altering the conveyor rate relative to the rate of descent of the curtain 30.

If desired, the confectionery bars 12 may be taken through more than one curtain 30 with the curtains being disposed of the same or different angles depending upon the effects required.

If desired, the confectionery bars may be passed through the curtain twice, the first time for the purpose of effecting a main coating operation and a second time for the purpose of ensuring that the coated bar is of the specified weight.

The curtain of chocolate (or another solidifiable liquid material) produced as described with reference to either or both of the illustrated embodiments may, instead of being used to enrobe articles such as confectionery bars, be used to form a layer of controlled properties (eg thickness) into moulds as an alternative to conventional depositing technology, followed by cooling to solidify the layer. Such a technique can be used to form shells for subsequent filling with a filling material. Alternatively, the curtain may be laid onto a conveyor to form a controlled layer thereon which is subsequently solidified and cut to size to the desired shape.

The invention claimed is:

1. An apparatus for coating an article, comprising:
    a trough for a liquid material, said trough having an opening configured to form a curtain from said liquid material for coating the article;
    a first gas layer defined between a first surface of said liquid material and said trough in a region proximate said opening; and
    a temperature controller for controlling a gas temperature of said first gas layer so that said gas temperature is substantially equal to a liquid temperature of said liquid material.

2. The apparatus as in claim 1, further comprising a moving device for generating relative movement between the article and said curtain so as to coat the article with said liquid material.

3. The apparatus as in claim 1, further comprising a second gas layer acting on said curtain to induce a change a direction of said curtain and/or a physical property of said liquid material forming said curtain.

4. The apparatus as in claim 1, further comprising a second gas layer defined between a second surface of said liquid material and said trough in said region.

5. The apparatus as in claim 1, wherein said liquid material is a non-Newtonian liquid material.

6. The apparatus as in claim 1, wherein said liquid material is a Newtonian liquid material.

7. The apparatus as in claim 1, wherein said liquid material is chocolate.

8. The apparatus as in claim 7, wherein said liquid material is a non-Newtonian liquid material.

9. The apparatus as in claim 7, wherein said liquid material is a Newtonian liquid material.

10. The apparatus as in claim 7, wherein said liquid material is chocolate.

11. An apparatus for coating an article, comprising:
    a liquid supply trough having a pair of V-shaped walls ending at an outlet slot through which a liquid material can flow under the action of gravity to form a curtain of the liquid material for coating the article;
    an additional wall in said liquid supply trough, said additional wall being inclined at an acute angle relative to a first wall of said pair of V-shaped walls, said additional wall terminating a predetermined distance above said outlet slot to define an air-admission slot; and
    a source of pressurized air in fluid communication with said air-admission slot so that a first gas layer can be defined between a first surface of the liquid material and a portion of said first wall between said outlet slot and said air-admission slot.

12. The apparatus as in claim 11, further comprising a second additional wall in said liquid supply trough, said second additional wall being inclined at said acute angle relative to a second wall of said pair of V-shaped walls, said second additional wall terminating said predetermined distance above said outlet slot to define a second air-admission slot, said second air-admission slot being in fluid communication with said source of pressurized air so that the first gas layer can be defined between a second surface of the liquid material and a portion of said second wall between said outlet slot and said second air-admission slot.

13. The apparatus as in claim 11, further comprising a moving device for generating relative movement between the article and said curtain so as to coat the article with the liquid material.

14. The apparatus as in claim 11, further comprising a temperature controller for controlling a gas temperature of the first gas layer so that said gas temperature is substantially equal to a liquid temperature of the liquid material.

15. An apparatus for coating an article, comprising:
    a trough having an opening configured to form a curtain of liquid material for coating the article;
    a gas-admission slot in said trough above said opening; and
    a source of pressurized gas in fluid communication with said gas-admission slot so that said gas-admission slot is configured to insert a first gas layer between a first surface of the liquid material and a surface of said trough proximate said opening.

16. The apparatus as in claim 15, further comprising a temperature controller for controlling a temperature of said first gas layer so that said temperature is substantially equal to a temperature of said liquid material.

17. The apparatus as in claim 15, further comprising a second gas-admission slot in said trough above said opening, said source of pressurized gas being in fluid communication with said second gas-admission slot so that said second gas-admission slot is configured to insert a second gas layer between a second surface of the liquid material and a second surface of said trough proximate said opening.

18. The apparatus as in claim 17, further comprising a temperature controller for controlling a temperature of said first and second gas layers so that said temperature is substantially equal to a temperature of said liquid material.

19. The apparatus as in claim 15, further comprising a moving device for generating relative movement between the article and said curtain so as to coat the article with said liquid material.

20. The apparatus as in claim 15, wherein said liquid material is chocolate.

* * * * *